(12) United States Patent
Flick

(10) Patent No.: US 7,737,820 B2
(45) Date of Patent: *Jun. 15, 2010

(54) REMOTE CONTROL SYSTEM FOR AN ACCESS DOOR HAVING REMOTE TRANSMITTER VERIFICATION

(75) Inventor: Kenneth E. Flick, Douglasville, GA (US)

(73) Assignee: Omega Patents, L.L.C., Douglasville, GA (US)

(*) Notice: Subject to any disclaimer, the term of this patent is extended or adjusted under 35 U.S.C. 154(b) by 2917 days.

This patent is subject to a terminal disclaimer.

(21) Appl. No.: 09/993,930

(22) Filed: Nov. 16, 2001

(65) Prior Publication Data

US 2002/0075133 A1 Jun. 20, 2002

Related U.S. Application Data

(63) Continuation-in-part of application No. 09/353,498, filed on Jul. 15, 1999, now Pat. No. 6,320,514, which is a continuation of application No. 08/622,515, filed on Mar. 25, 1996, now Pat. No. 6,140,938, which is a continuation-in-part of application No. 08/423,570, filed on Apr. 14, 1995, now Pat. No. 5,654,688.

(51) Int. Cl.
- G05B 19/00 (2006.01)
- G06F 7/00 (2006.01)
- G06K 19/00 (2006.01)
- H04B 1/00 (2006.01)
- H04Q 1/00 (2006.01)

(52) U.S. Cl. .............. 340/5.22; 340/5.23; 340/5.3; 340/5.7; 340/7.39; 340/7.51

(58) Field of Classification Search ............... 340/5.64, 340/825.69, 825.72, 426, 539, 825.37, 5.71, 340/5.22, 5.23–5.28, 5.3–5.32, 5.7–5.74, 340/7.39, 7.51–7.59; 341/176, 174; 307/10.1
See application file for complete search history.

(56) References Cited

U.S. PATENT DOCUMENTS 3,792,493 A 2/1974 Hughes ................ 346/20

(Continued)

FOREIGN PATENT DOCUMENTS

DE 4325221 7/1993

(Continued)

OTHER PUBLICATIONS

Owners Manual, 8-IN-1 Universal Remote Control, Cat No. 15-1903A, 1990 Tandy Corporation, pp. 1-37.

(Continued)

Primary Examiner—Brian A Zimmerman
Assistant Examiner—Nam V Nguyen
(74) Attorney, Agent, or Firm—Allen, Dyer, Doppelt, Milbrath & Gilchrist, P.A.

(57) ABSTRACT

A remote control system for moving an access door includes an indicator, at least one uniquely coded remote transmitter, and a controller that is switchable to a learning mode for learning a unique code of a remote transmitter to define a learned remote transmitter. The controller is switchable to a door moving mode based upon receiving a signal from the learned remote transmitter. The controller cooperates with the indicator for indicating whether a new uniquely coded remote transmitter has been learned based upon the controller being switched to the door moving mode to thereby alert a user of a potentially unauthorized learned remote transmitter. Alternately, a remote switch may be used to activate the indicator.

66 Claims, 3 Drawing Sheets

U.S. PATENT DOCUMENTS

| | | | |
|---|---|---|---|
| 4,205,300 A | 5/1980 | Ho et al. | 340/65 |
| 4,327,444 A | 4/1982 | Court | 455/100 |
| 4,383,242 A | 5/1983 | Sassover et al. | 340/64 |
| 4,414,541 A | 11/1983 | Ho | 40/566 |
| 4,450,437 A | 5/1984 | Ho | 40/540 |
| 4,529,980 A * | 7/1985 | Liotine et al. | 340/825.52 |
| 4,628,400 A | 12/1986 | Ho | 61/172 |
| 4,674,454 A | 6/1987 | Phairr | 123/179 B |
| 4,750,118 A * | 6/1988 | Heitschel et al. | 700/90 |
| 4,754,255 A | 6/1988 | Sanders et al. | 340/64 |
| 4,812,814 A | 3/1989 | Elliott | 340/332 |
| 4,893,240 A | 1/1990 | Karkouti | 364/424.05 |
| 5,024,186 A | 6/1991 | Long et al. | 123/179 B |
| 5,040,990 A | 8/1991 | Suman et al. | 439/34 |
| 5,049,867 A | 9/1991 | Stouffer | 340/426 |
| 5,103,221 A | 4/1992 | Memmola | 340/825.31 |
| 5,129,376 A | 7/1992 | Parmley | 123/179.2 |
| 5,132,660 A | 7/1992 | Chen et al. | 340/428 |
| 5,146,215 A | 9/1992 | Drori | 340/825.32 |
| 5,159,334 A | 10/1992 | Baumert et al. | 340/825.72 |
| 5,252,966 A | 10/1993 | Lambropoulos et al. | 340/825.69 |
| 5,278,547 A | 1/1994 | Suman et al. | 340/825.32 |
| 5,285,186 A | 2/1994 | Chen | 340/428 |
| 5,309,144 A | 5/1994 | Lacombe et al. | 340/539 |
| 5,323,140 A | 6/1994 | Boyles | 340/428 |
| 5,349,931 A | 9/1994 | Gottlieb et al. | 123/179.2 |
| 5,365,225 A | 11/1994 | Bachhuber | 340/825.31 |
| 5,412,379 A | 5/1995 | Waraksa et al. | 340/825.72 |
| 5,442,340 A * | 8/1995 | Dykema | 340/825.22 |
| 5,479,155 A * | 12/1995 | Zeinstra et al. | 340/825.22 |
| 5,654,688 A | 8/1997 | Allen et al. | 340/426 |
| 5,815,084 A * | 9/1998 | Lavelle et al. | 340/5.22 |
| 6,046,680 A * | 4/2000 | Soenen et al. | 340/5.23 |
| 6,140,938 A * | 10/2000 | Flick | 340/825.69 |

FOREIGN PATENT DOCUMENTS

| | | |
|---|---|---|
| EP | 0535555 | 4/1993 |
| WO | 91/15645 | 10/1991 |
| WO | 92/02702 | 2/1992 |

OTHER PUBLICATIONS

Lexus, *1995 Repair Manual SC400 SC300*, vol. 3, (first printing Jan. 10, 1994) pp. BE-479-BE522.

Linear Mega Code, Installation Instructions, pp. 1-2, Jul. 23, 2001, www.hooverfence.net.

* cited by examiner

REMOTE CONTROL SYSTEM FOR AN ACCESS DOOR HAVING REMOTE TRANSMITTER VERIFICATION

RELATED APPLICATIONS

The present application is a continuation-in-part of U.S. patent application Ser. No. 09/353,498 filed on Jul. 15, 1999 now U.S. Pat. No. 6,320,514 which is a continuation of U.S. patent application Ser. No. 08/622,515 filed on Mar. 25, 1996 now U.S. Pat. No. 6,140,938, which is a continuation-in-part of U.S. patent application Ser. No. 08/423,570 filed Apr. 14, 1995, now U.S. Pat. No. 5,654,688, the entire disclosures of each being incorporated herein by reference.

FIELD OF THE INVENTION

The present invention relates to the field of remote control systems, and more particularly, to a remote control system for moving an access door.

BACKGROUND OF THE INVENTION

A typical remote control system for an access door, such as a garage door, for example, includes a receiver associated with a controller that cooperates with one or more remote transmitters. The controller is used to operate a motor that moves the access door between open or closed positions.

The controller may include features to store and compare unique codes associated with the remote transmitters, with each remote transmitter having its own unique code initially programmed therein. The unique codes may be added or learned into the controller or deleted from the controller.

Unfortunately, a would-be thief gaining access to the controller may readily enter its programming or learn mode to install the code of an unauthorized remote transmitter. The owner would thus be unaware of such activity, until the thief returns with the unauthorized remote transmitter to open the access door to steal items from within the closed off area.

A remote control system for a garage door sold by Linear Corp. includes an LED that indicates the number of learned remote transmitters by blinking an indicator light which allows the user to confirm the number of such transmitters upon learning a new remote transmitter. Unfortunately, activation of the LED is not readily convenient or accessible to the owner after installation of the controller. This is particularly so since the activation button is carried by a housing that is mounted to the ceiling of the garage. The housing also carries the receiver, the controller and the motor.

SUMMARY OF THE INVENTION

In view of the foregoing background, it is therefore an object of the present invention to provide remote transmitter verification for a remote control system for an access door that is straightforward to activate while also being convenient to the user.

This and other objects, features and advantages in accordance with the present invention are provided by a remote control system for moving an access door that comprises at least one indicator, at least one uniquely coded remote transmitter, and a controller being switchable to a learning mode for learning a unique code of a remote transmitter to define a learned remote transmitter.

The controller is also preferably switchable to a door moving mode for moving the access door based upon receiving a signal from the learned remote transmitter. The controller cooperates with the at least one indicator for indicating whether a new uniquely coded remote transmitter has been learned based upon the controller being switched to the door moving mode to thereby alert a user of a potentially unauthorized learned remote transmitter. A remote door switch may also be used for switching the controller to the door moving mode.

The access door may be a garage door. The indicator may include at least one of a light, a visual display, a speech message generator, and an audible signal generator. The indicator may be an on-board indicator carried by the housing of the remote control system, and/or a remote indicator, such as mounted on a wall in the garage. In other embodiments, the controller continuously or repeatedly cooperates with the indicator for indicating whether a new uniquely coded remote transmitter has been learned.

The indication for whether a new uniquely coded remote transmitter has been learned may include indicating a number of learned remote transmitters. This particular feature of the present invention advantageously alerts the user of a potentially unauthorized learned remote transmitter every time the controller is in the door moving mode, i.e., the access door is moved. In one embodiment, the controller cooperates with the indicator that the learning mode has recently been exited. This particular feature advantageously alerts the user regardless of whether a new remote transmitter has been learned.

The remote control system may further comprise a remote indicator switch for causing the controller to cooperate with the indicator for indicating whether a new uniquely coded remote transmitter has been learned. This particular feature of the present invention advantageously alerts the user of a potentially unauthorized learned remote transmitter without necessarily having to place the controller in the door moving mode, i.e., the access door does not need to be moved.

The remote control system may further comprise at least one light connected to the controller, with the light being energized when the controller is switched to the door moving mode. A remote light switch also preferably causes the light to be energized, and causes the controller to cooperate with the indicator for indicating whether a new uniquely coded remote transmitter has been learned. This particular feature of the present invention advantageously alerts the user of a potentially unauthorized learned remote transmitter when the light is energized.

The indication for whether a new uniquely coded remote transmitter has been learned may also be provided using the remote transmitter comprising a learned transmitter indicator switch for causing the controller to cooperate with the indicator for indicating whether a new uniquely coded remote transmitter has been learned. This particular feature of the present invention advantageously alerts the user of a potentially unauthorized learned remote transmitter using the remote transmitter.

In yet another embodiment, the controller comprises a fixed transceiver, and the remote transmitter comprises a remote transceiver and a remote indicator associated therewith. Accordingly, selection of the learned transmitter indicator switch causes the controller to cooperate with the remote indicator via the fixed and remote transceivers for indicating whether a new uniquely coded remote transmitter has been learned.

In place of or in addition to the controller cooperating with the indicator for indicating a number of learned remote transmitters, the controller may cooperate with the indicator for indicating a change in a number of learned remote transmitters, or for indicating a change in a unique code of the learned remote transmitters. In addition, each learned remote transmitter may transmit a pseudorandomly coded signal to the controller.

A first method aspect of the present invention is for moving an access door using a remote control system comprising a controller and at least one uniquely coded remote transmitter. The method may comprise switching the controller to a learning mode for learning a unique code of a remote transmitter to define a learned remote transmitter, and switching the controller to a door moving mode for moving the access door based upon receiving a signal from a learned remote transmitter. An indication of whether a new uniquely coded remote transmitter has been learned is based upon the controller being switched to the door moving mode to thereby alert a user of a potentially unauthorized learned remote transmitter.

In accordance with a second method aspect of the present invention, an indication of whether a new uniquely coded remote transmitter has been learned is based upon activation of a remote switch to thereby alert a user of a potentially unauthorized learned remote transmitter.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
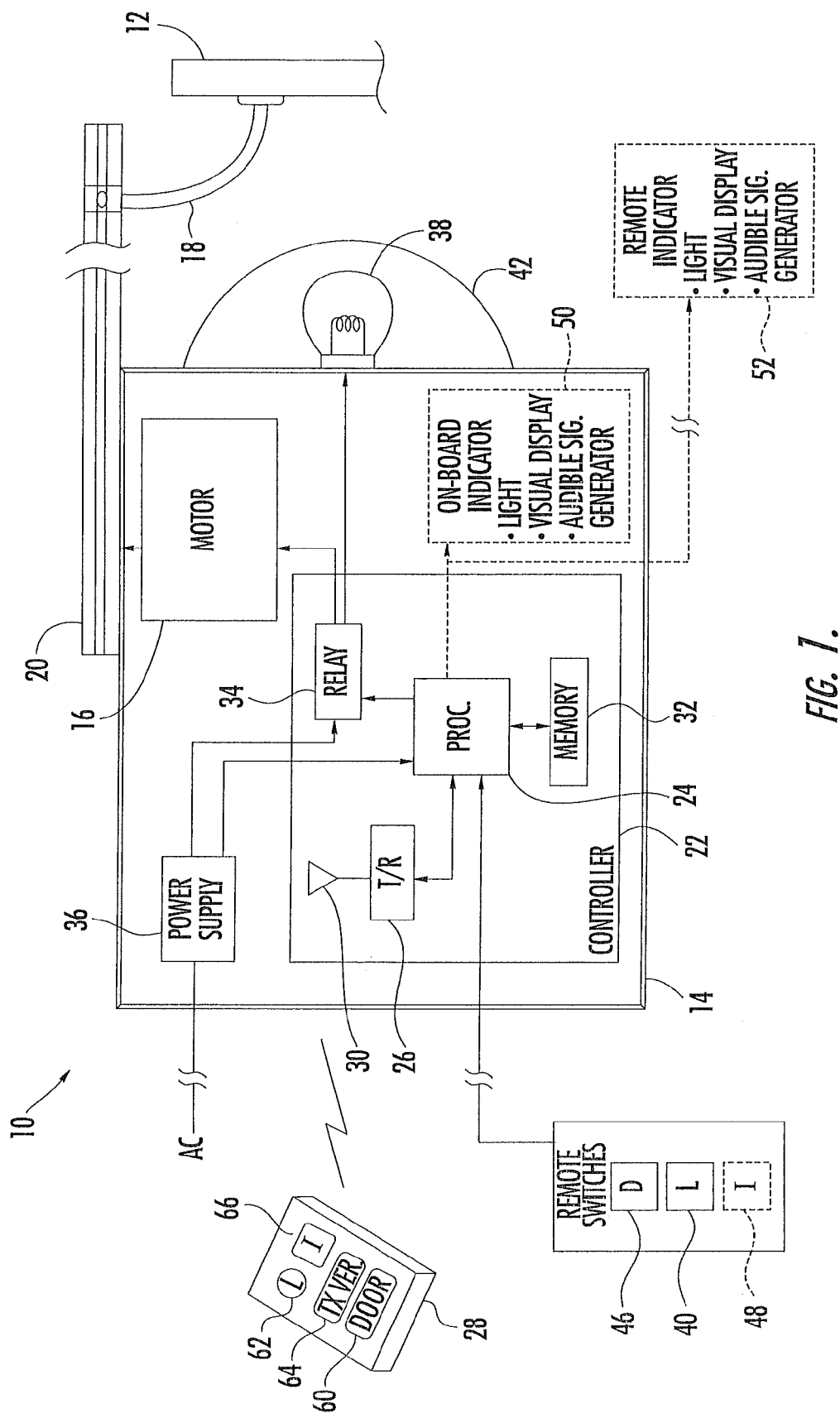
FIG. 1 is a schematic block diagram of a remote control system for an access door in accordance with the present invention.

Referring initially to FIG. 1, a remote control system 10 for moving an access door in accordance with the present invention will now be described. In the illustrated embodiment, the access door is a garage door 12 as will now be discussed herein. The present invention is readily applicable to other types of access doors, as readily appreciated by those skilled in the art.

The illustrated remote control system 10 includes a housing 14 mounted to the ceiling of a garage. The housing 14 carries a motor 16 for moving the garage door between open and closed positions. The motor 16 may drive a belt or chain, for example, to which a trolley 18 is attached so that the garage door 12 moves along a rail 20.

The motor 16 operates in response to a controller 22 that is also carried by the housing 14. In the illustrated embodiment, the controller 22 includes a central processing unit or microprocessor 24 operating under stored program control. A transmitter/receiver 26 is connected to the microprocessor 24 for receiving signals from a remote transmitter 28 and for transmitting signals thereto, as will be described in greater detail below. As would be readily understood by those skilled in the art, the transmitter portion of the controller 22 may not be needed in some embodiments of the invention. An antenna 30 is illustratively connected to the transmitter/receiver 26.

The microprocessor 24 is also operatively connected to a memory 32, such as an EEPROM, for example. As would be readily understood by those skilled in the art, the microprocessor 24 may alternately or additionally have its own on-board memory. An output of the microprocessor 24 energizes a relay 34 for providing power to the motor 16.

Power is initially provided to the microprocessor 24 as well as to the relay 34 by a power supply 36 carried by the housing 14. The power supply 36 typically converts AC power from an external line source to a DC level. The relay 34 also provides power to a light 38. The light 38 is typically energized when the motor 16 is energized, or when a remote wall mounted light switch 40 is pressed. The light 38 may be protected by a transparent or translucent cover 42, for example, that is also carried by the housing 14.

The remote control system 10 includes at least one indicator for alerting the user whether a new uniquely coded remote transmitter has been learned, which may possibly be an unauthorized remote transmitter. In the illustrated embodiment, the indicator may be an on-board indicator 50 carried by the housing 14 and/or a remote indicator 52 external the housing. The external indicator 52 is typically mounted on a wall in the garage.

The indicators 50, 52 may be at least one of a light, a visual display, a speech message generator or an audible signal generator as readily appreciated by those skilled in the art. Other similar indicating devices are also contemplated by the present invention, as would be readily understood by those skilled in the art. In particular, the on-board indicator 50 may be provided by the typical light bulb 38 used for illumination. The remote indicator 52 may be carried by the same housing that carries the remote switches 46, 40, and 48, for example.

Activation of the indicators 50, 52 will now be discussed. The controller 22 is switchable between a learning mode and a door moving mode. The learning mode is for learning a unique code of a remote transmitter 28 to define a learned remote transmitter. Once the remote transmitter 28 has been learned, the controller 22 is switchable to a door moving mode for moving the garage door 12 based upon receiving a signal from the learned remote transmitter.

The controller 22 cooperates with the indicators 50, 52 for indicating whether a new uniquely coded remote transmitter has been learned based upon the controller being switched to the door moving mode. The door moving mode is thus achieved when the controller 22 provides an output signal for causing the motor 16 to be energized via the illustrated relay 34.

This particular feature of the present invention advantageously alerts the user of a potentially unauthorized learned remote transmitter every time the garage door 12 is moved. In fact, the user is still alerted even if the garage door 12 does not move, but the controller 22 is in the door moving mode. For example, the trolley 18 may be disconnected from the drive mechanism, yet the controller 22 is in the door moving mode.

The remote control system 10 further illustratively includes a remote door switch 46 for placing the controller 22 in the door moving mode. Consequently, the user would also be alerted of a potentially unauthorized learned remote transmitter via the indicators 50, 52. In other embodiments, the controller 22 may continuously or repeatedly cooperate with the indicators for indicating whether a new uniquely coded remote transmitter has been learned.

Yet another advantageous feature of the present invention is a remote indicator switch 48 for causing the controller 22 to cooperate with the indicators 50, 52 for indicating whether a new uniquely coded remote transmitter has been learned. In other words, the user is able to determine if there is an unauthorized remote transmitter without moving the garage door 12. In the illustrated embodiment, the remote indicator switch 48 is adjacent the remote light switch 40 the remote door switch 46.

As noted above, the remote control system 10 includes a remote light switch 40 connected to the controller 22 for energizing the light 38. The remote light switch 40 may also be used for causing the controller 22 to cooperate with the indicators 50, 52 for indicating whether a new uniquely coded remote transmitter has been learned. As with the remote indicator switch 48, the user is able to determine with the remote light switch 40 if there is an unauthorized remote transmitter without placing the controller 22 in the door moving mode, i.e., the garage door 12 does not need to be moved. In addition, the light 38 may also be energized to indicate that the learning mode has recently been exited. The light 38 may progressively indicate a passage of time since the learning mode has been exited.

The remote transmitter 28 in accordance with the invention will now be described. The remote transmitter 28 includes a first momentary switch 60 for placing the controller 22 in the door moving mode. An indicating light 62, such as an LED, indicates when the transmitter within the remote transmitter 28 is transmitting.

The remote transmitter 28 may further include a second momentary switch 64, referred to herein as a learned remote transmitter indicator switch. Selection of the second momentary switch 64 causes the controller 22 to cooperate with the indicators 50, 52 for indicating whether a new uniquely coded remote transmitter has been learned.

In addition, the remote transmitter 28 may include a receiver and an indicator 66 associated therewith so that selection of the second momentary switch 64 causes the controller 22 to cooperate with this indicator via the transmitter/receiver 26 in the housing 14 and the transmitter and receiver within the remote transmitter 28 for indicating whether a new uniquely coded remote transmitter has been learned.

Of course, if the remote transmitter 28 does not include the receiver, then the second momentary switch 64 and the indicator 66 are not required. Consequently, the transmitter portion of the controller 22 would not be required.

As discussed above, the controller 22 is switchable between the learning mode and the door moving mode. The learning mode is for learning a unique code of a remote transmitter 28 to define a learned remote transmitter. When the controller 22 enters the learning mode, all prior learned remote transmitters are deleted. Alternatively, when the controller 22 enters the learning mode, the oldest learned remote transmitter is deleted with the new remote transmitter being learned. In other words, the learning mode for the learned remote transmitters may be in a first in, last out type of arrangement.

In one embodiment, the controller 22 cooperates with the indicator 50, 52 for indicating that the learning mode has recently been exited to thereby alert a user of a potentially unauthorized learned remote transmitter. The indication may also be provided via the light 38. The indicators 50, 52 or even the light 38 may progressively indicate a passage of time since the learning mode has been exited.

In lieu of or in addition to the controller 22 cooperating with the indicators 50, 52 for indicating a number of learned remote transmitters, the controller may cooperate with the indicators for indicating a change in a number of learned remote transmitters, and/or for indicating a change in a unique code of the learned remote transmitters. The controller 22 may also indicate via the indicators 50, 52 that the learning mode has been entered. This indication can be provided by progressively indicating the elapsed time since the learning mode has last been entered.

The system 10 may use pseudorandom or rolling codes wherein the controller 22 is switched to the door moving mode responsive to receiving a correct pseudorandomly coded signal from the remote transmitter 28. The transmitted signal from the remote transmitter 28 may include a unique identifier portion identifying a transmitter, which is fixed, and a code changing portion synchronized with the receiver 26, as readily understood by those skilled in the art.

Figure 2:
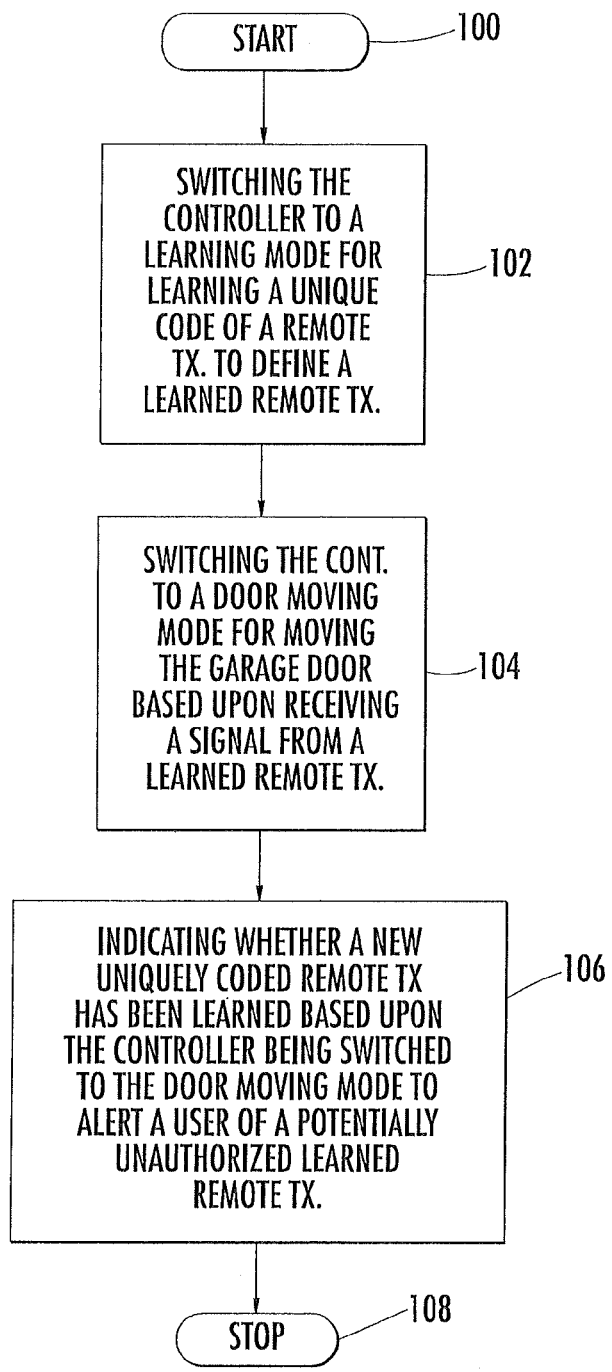
FIG. 2 is a flowchart illustrating one embodiment for remote transmitter verification in accordance with the present invention.

A method aspect in accordance with the present invention for moving an access door, such as the garage door 12, will now be discussed with additional reference to the flowchart of FIG. 2. As discussed above, the remote control system 10 includes a controller 22 and at least one uniquely coded remote transmitter 28. From the start (Block 100) the method comprises switching the controller 22 to a learning mode for learning a unique code of a remote transmitter 28 to define a learned remote transmitter at Block 102, and switching the controller to a door moving mode for moving the garage door 12 based upon receiving a signal from a learned remote transmitter.

The method further illustratively includes indicating whether a new uniquely coded remote transmitter 28 has been learned based upon the controller 22 being switched to the door moving mode. Accordingly, the user is alerted of a potentially unauthorized learned remote transmitter at Block 106, before stopping at Block 108.

Figure 3:
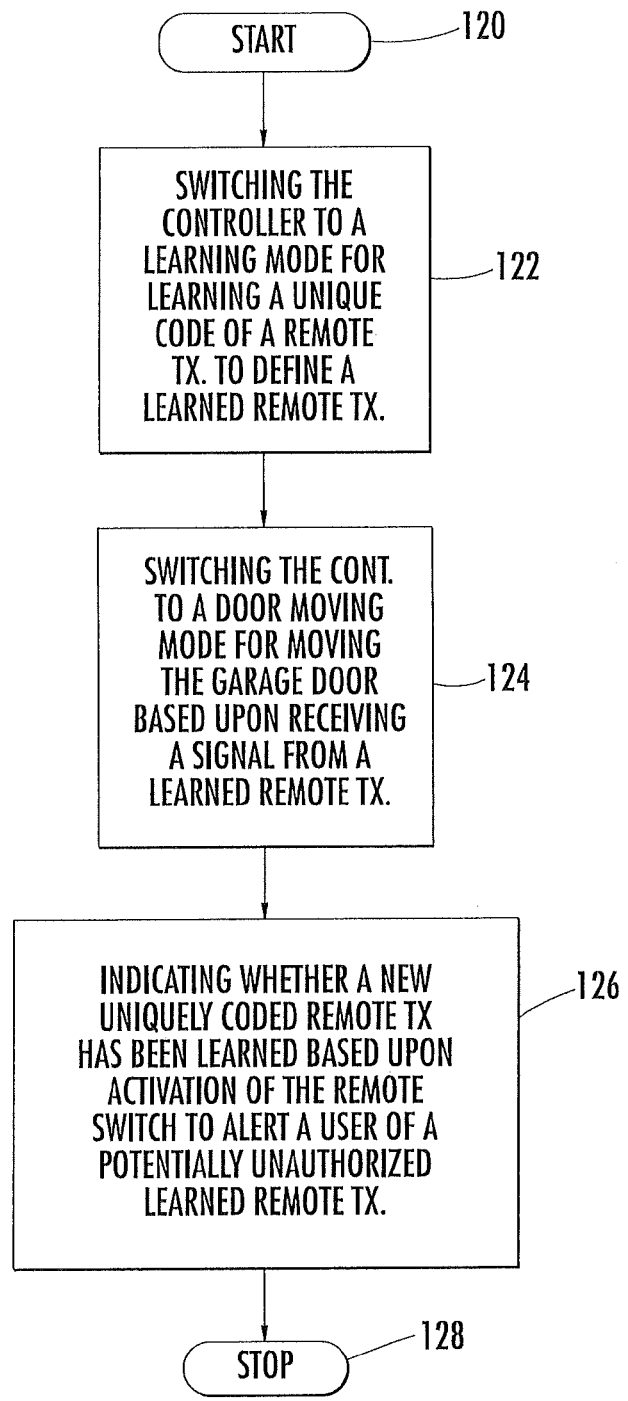
FIG. 3 is a flowchart illustrating another embodiment for remote transmitter verification in accordance with the present invention.

Yet another method aspect in accordance with the present invention for moving the access door, such as the garage door 12, will now be discussed with reference to the flowchart of FIG. 3. From the start (Block 120) the method comprises switching the controller 22 to a learning mode for learning a unique code of a remote transmitter 28 to define a learned remote transmitter at Block 122, and switching the controller to a door moving mode for moving the garage door based upon receiving a signal from a learned remote transmitter at Block 124.

The method further includes indicating whether a new uniquely coded remote transmitter 28 has been learned based upon activation of at least one remote switch 48 to thereby alert a user of a potentially unauthorized learned remote transmitter at Block 126, before stopping at Block 128.

Many modifications and other embodiments of the invention will come to the mind of one skilled in the art having the benefit of the teachings presented in the foregoing descriptions and the associated drawings. For example, time lapse and code reset features as disclosed in U.S. Pat. No. 6,144,315, for example, which is incorporated herein by reference in its entirety, may be incorporated into the present invention as would be appreciated by one skilled in the art. Therefore, it is to be understood that the invention is not to be limited to the specific embodiments disclosed, and that modifications and embodiments are intended to be included within the scope of the appended claims.

The invention claimed is:

1. A remote control system for moving an access door and comprising:
    at least one indicator;
    at least one uniquely coded remote transmitter; and
    a controller being switchable to a learning mode for learning a unique code of a remote transmitter to define a learned remote transmitter, said controller also being switchable to a door moving mode for moving the access door based upon receiving a signal from the learned remote transmitter;

said controller cooperating with said at least one indicator for indicating whether a new uniquely coded remote transmitter has been learned based upon said controller being switched to the door moving mode.

2. A remote control system according to claim 1 wherein indication of whether a new uniquely coded remote transmitter has been learned comprises indicating a number of learned remote transmitters.

3. A remote control system according to claim 1 wherein said controller cooperates with said at least one indicator for indicating a change in a number of learned remote transmitters.

4. A remote control system according to claim 1 wherein said controller cooperates with said at least one indicator for indicating a change in a unique code of learned remote transmitters.

5. A remote control system according to claim 1 wherein said at least one indicator comprises at least one of a light, a visual display, a speech message generator, and an audible signal generator.

6. A remote control system according to claim 1 further comprising a remote door switch for switching said controller to the door moving mode.

7. A remote control system according to claim 1 further comprising a remote indicator switch for causing said controller to cooperate with said at least one indicator for indicating whether a new uniquely coded remote transmitter has been learned.

8. A remote control system according to claim 1 further comprising:
at least one light connected to said controller and being energized when said controller is switched to the door moving mode; and
a remote light switch for also causing said at least one light to be energized, and for causing said controller to cooperate with said at least one indicator for indicating whether a new uniquely coded remote transmitter has been learned.

9. A remote control system according to claim 1 wherein said at least one uniquely coded remote transmitter comprises a learned transmitter indicator switch for causing said controller to cooperate with said at least one indicator for indicating whether a new uniquely coded remote transmitter has been learned.

10. A remote control system according to claim 9 wherein said controller comprises a fixed transceiver, and wherein said at least one uniquely coded remote transmitter comprises a remote transceiver and a remote indicator associated therewith so that selection of said learned transmitter indicator switch causes said controller to cooperate with said remote indicator via said fixed and remote transceivers for indicating whether a new uniquely coded remote transmitter has been learned.

11. A remote control system according to claim 1 wherein the learned remote transmitter transmits a pseudorandomly coded signal to said controller.

12. A remote control system according to claim 1 wherein the access door comprises a garage door.

13. A remote control system for moving an access door and comprising:
at least one indicator;
at least one uniquely coded remote transmitter;
a controller being switchable to a learning mode for learning a unique code of a remote transmitter to define a learned remote transmitter, said controller also being switchable to a door moving mode for moving the access door based upon receiving a signal from the learned remote transmitter; and
at least one remote switch for causing said controller to cooperate with said at least one indicator for indicating whether a new uniquely coded remote transmitter has been learned;
wherein indication of whether a new uniquely coded remote transmitter has been learned comprises indicating a number of learned remote transmitters.

14. A remote control system according to claim 13 wherein said controller cooperates with said at least one indicator for indicating a change in a number of learned remote transmitters.

15. A remote control system according to claim 14 wherein the access door comprises a garage door.

16. A remote control system according to claim 13 wherein said controller cooperates with said at least one indicator for indicating a change in a unique code of learned remote transmitters.

17. A remote control system according to claim 13 wherein said at least one indicator comprises at least one of a light, a visual display, a speech message generator, and an audible signal generator.

18. A remote control system according to claim 13 wherein said at least one remote switch also switches said controller to the door moving mode.

19. A remote control system according to claim 13 wherein said controller further cooperates with said at least one indicator for indicating whether a new uniquely coded remote transmitter has been learned based upon said controller being switched to the door moving mode.

20. A remote control system according to claim 13 further comprising at least one light connected to said controller and being energized when said controller is switched to the door moving mode; and wherein said at least one remote switch also causes said at least one light to be energized.

21. A remote control system according to claim 13 wherein said at least one uniquely coded remote transmitter comprises a learned transmitter indicator switch for causing said controller to cooperate with said at least one indicator for indicating whether a new uniquely coded remote transmitter has been learned.

22. A remote control system according to claim 21 wherein said controller comprises a fixed transceiver, and wherein said at least one uniquely coded remote transmitter comprises a remote transceiver and a remote indicator associated therewith so that selection of said learned transmitter indicator switch causes said controller to cooperate with said remote indicator via said fixed and remote transceivers for indicating whether a new uniquely coded remote transmitter has been learned.

23. A remote control system for moving an access door and comprising:
at least one indicator;
at least one uniquely coded remote transmitter; and
a controller being switchable to a learning mode for learning a unique code of a remote transmitter to define a learned remote transmitter, said controller also being switchable to a door moving mode for moving the access door based upon receiving a signal from the learned remote transmitter;
said controller cooperating with said at least one indicator for continuously indicating whether a new uniquely coded remote transmitter has been learned;

wherein indication of whether a new uniquely coded remote transmitter has been learned comprises indicating a number of learned remote transmitters.

24. A remote control system according to claim 23 wherein said at least one indicator comprises at least one of a light, a visual display, a speech message generator, and an audible signal generator.

25. A remote control system according to claim 23 further comprising a remote door switch for switching said controller to the door moving mode.

26. A remote control system according to claim 23 wherein the access door comprises a garage door.

27. A remote control system for moving an access door and comprising:
- at least one indicator;
- at least one uniquely coded remote transmitter; and
- a controller being switchable to a learning mode for learning a unique code of a remote transmitter to define a learned remote transmitter, said controller also being switchable to a door moving mode for moving the access door based upon receiving a signal from the learned remote transmitter;
- said controller cooperating with said at least one indicator for repeatedly indicating whether a new uniquely coded remote transmitter has been learned;
- wherein indication of whether a new uniquely coded remote transmitter has been learned comprises indicating a number of learned remote transmitters.

28. A remote control system according to claim 27 wherein said at least one indicator comprises at least one of a light, a visual display, a speech message generator, and an audible signal generator.

29. A remote control system according to claim 27 further comprising a remote door switch for switching said controller to the door moving mode.

30. A remote control system according to claim 27 wherein the access door comprises a garage door.

31. A remote control system for moving an access door and comprising:
- at least one indicator;
- at least one uniquely coded remote transmitter; and
- a controller being switchable to a learning mode for learning a unique code of a remote transmitter to define a learned remote transmitter, said controller also being switchable to a door moving mode for moving the access door based upon receiving a signal from the learned remote transmitter;
- said controller cooperating with said at least one indicator for indicating that the learning mode has recently been exited;
- wherein said at least one indicator progressively indicates a passage of time since the learning mode has been exited.

32. A remote control system according to claim 31 wherein said at least one indicator comprises at least one of a light, a visual display, a speech message generator, and an audible signal generator.

33. A remote control system according to claim 31 wherein said controller also cooperates with said at least one indicator for indicating whether a new uniquely coded remote transmitter has been learned based upon said controller being switched to the door moving mode to thereby alert a user of a potentially unauthorized learned remote transmitter.

34. A remote control system according to claim 33 wherein indication of whether a new uniquely coded remote transmitter has been learned comprises indicating a number of learned remote transmitters.

35. A remote control system according to claim 33 wherein said controller cooperates with said at least one indicator for indicating a change in a number of learned remote transmitters.

36. A remote control system according to claim 33 wherein said controller cooperates with said at least one indicator for indicating a change in a unique code of learned remote transmitters.

37. A remote control system according to claim 31 further comprising a remote door switch for switching said controller to the door moving mode.

38. A remote control system according to claim 31 further comprising a remote indicator switch for causing said controller to also cooperate with said at least one indicator for indicating whether a new uniquely coded remote transmitter has been learned.

39. A remote control system according to claim 31 further comprising:
- at least one light connected to said controller and being energized when said controller is switched to the door moving mode; and
- a remote light switch for also causing said at least one light to be energized, and for causing said controller to also cooperate with said at least one indicator for indicating whether a new uniquely coded remote transmitter has been learned.

40. A remote control system according to claim 31 wherein said at least one uniquely coded remote transmitter comprises a learned transmitter indicator switch for causing said controller to also cooperate with said at least one indicator for indicating whether a new uniquely coded remote transmitter has been learned.

41. A remote control system according to claim 40 wherein said controller comprises a fixed transceiver, and wherein said at least one uniquely coded remote transmitter comprises a remote transceiver and a remote indicator associated therewith so that selection of said learned transmitter indicator switch causes said controller to cooperate with said remote indicator via said fixed and remote transceivers for indicating whether a new uniquely coded remote transmitter has been learned.

42. A remote control system according to claim 31 wherein the learned remote transmitter transmits a pseudorandomly coded signal to said controller.

43. A remote control system according to claim 31 wherein the access door comprises a garage door.

44. A method for moving an access door using a remote control system comprising a controller and at least one uniquely coded remote transmitter, the method comprising:
- switching the controller to a learning mode for learning a unique code of a remote transmitter to define a learned remote transmitter;
- switching the controller to a door moving mode for moving the access door based upon receiving a signal from the learned remote transmitter; and
- indicating whether a new uniquely coded remote transmitter has been learned based upon the controller being switched to the door moving mode to thereby alert a user of a potentially unauthorized learned remote transmitter.

45. A method according to claim 44 wherein the indicating comprises indicating a number of learned remote transmitters.

46. A method according to claim 44 wherein the controller cooperates with the at least one indicator for indicating a change in a number of learned remote transmitters.

47. A method according to claim 44 wherein the controller cooperates with the at least one indicator for indicating a change in a unique code of learned remote transmitters.

48. A method according to claim 44 wherein the indicating is performed using at least one of a light, a visual display, a speech message generator, and an audible signal generator.

49. A method according to claim 44 further comprising switching the controller to the door moving mode using a remote door switch.

50. A method according to claim 44 further comprising using a remote indicator switch for causing the controller to cooperate with the at least one indicator for indicating whether a new uniquely coded remote transmitter has been learned.

51. A method according to claim 44 wherein the remote control system further comprises at least one light connected to the controller and being energized when the controller is switched to the door moving mode; and further comprising using a remote light switch for also causing the at least one light to be energized, and for causing the controller to cooperate with the at least one indicator for indicating whether a new uniquely coded remote transmitter has been learned.

52. A method according to claim 44 wherein the at least one uniquely coded remote transmitter comprises a learned transmitter indicator switch for causing the controller to cooperate with the at least one indicator for indicating whether a new uniquely coded remote transmitter has been learned.

53. A method according to claim 52 wherein the controller comprises a fixed transceiver, and wherein the at least one uniquely coded remote transmitter comprises a remote transceiver and a remote indicator associated therewith so that selection of the learned transmitter indicator switch causes the controller to cooperate with the remote indicator via the fixed and remote transceivers for indicating whether a new uniquely coded remote transmitter has been learned.

54. A method according to claim 44 wherein the learned remote transmitter transmits a pseudorandomly coded signal to the controller.

55. A method according to claim 44 wherein the access door comprises a garage door.

56. A method for moving an access door using a remote control system comprising a controller, at least one remote switch, and at least one uniquely coded remote transmitter, the method comprising:
switching the controller to a learning mode for learning a unique code of a remote transmitter to define a learned remote transmitter;
switching the controller to a door moving mode for moving the access door based upon receiving a signal from the learned remote transmitter; and
indicating whether a new uniquely coded remote transmitter has been learned based upon activation of the at least one remote switch to thereby alert a user of a potentially unauthorized learned remote transmitter;
wherein the indicating comprises indicating a number of learned remote transmitters.

57. A method according to claim 56 wherein the controller cooperates with the at least one indicator for indicating a change in a number of learned remote transmitters.

58. A method according to claim 56 wherein the controller cooperates with the at least one indicator for indicating a change in a unique code of learned remote transmitters.

59. A method according to claim 56 wherein the indicating is performed using at least one of a light, a visual display, a speech message generator, and an audible signal generator.

60. A method according to claim 56 wherein switching the controller to the door moving also causes the indicating to be performed.

61. A method according to claim 56 wherein the at least one remote switch also switches the controller to the door moving mode.

62. A method according to claim 56 wherein the remote control system further comprises at least one light connected to the controller and being energized when the controller is switched to the door moving mode; and further comprising using a remote light switch for also causing the at least one light to be energized, and for causing the controller to cooperate with the at least one indicator for indicating whether a new uniquely coded remote transmitter has been learned.

63. A method according to claim 56 wherein the at least one uniquely coded remote transmitter comprises a learned transmitter indicator switch for causing the controller to cooperate with the at least one indicator for indicating whether a new uniquely coded remote transmitter has been learned.

64. A method according to claim 63 wherein the controller comprises a fixed transceiver, and wherein the at least one uniquely coded remote transmitter comprises a remote transceiver and a remote indicator associated therewith so that selection of the learned transmitter indicator switch causes the controller to cooperate with the remote indicator via the fixed and remote transceivers for indicating whether a new uniquely coded remote transmitter has been learned.

65. A method according to claim 56 wherein the learned remote transmitter transmits a pseudorandomly coded signal to the controller.

66. A method according to claim 56 wherein the access door comprises a garage door.

* * * * *